United States Patent Office 3,365,516
Patented Jan. 23, 1968

3,365,516
FLEXIBLE EPOXY RESINS FORMED FROM POLY-EPOXIDES, DIGLYCIDYL ETHERS OF POLYEPI-CHLOROHYDRIN, AND AN AMINE CURING AGENT
Wesley E. Prescott, Lake Jackson, Tex., and Frank A. Bartolomeo, Westerly, R.I., assignors to The Dow Chemical Company, Midland, Mich., a corporation of Delaware
No Drawing. Continuation-in-part of application Ser. No. 49,418, Aug. 15, 1960. This application Mar. 5, 1965, Ser. No. 437,546
9 Claims. (Cl. 260—830)

ABSTRACT OF THE DISCLOSURE

Flexible epoxy resins may be formed by curing a mixture of a polyepoxide, a diglycidyl ether of polyepichlorohydrin, and a hardening agent exemplified by polyalkylene polyamines, and p,p'-methylene dianiline. In an example 50 parts of the diglycidyl ether of polyepichlorohydrin were combined with 50 parts of the diglycidyl ether of bisphenol A together with a catalytic amount of diethylene triamine and cured at 100° C. for 4.5 hours.

---

This application is a continuation-in-part of application Ser. No. 49,418, filed August 15, 1960, now abandoned.

The present invention relates to flexibilizers for epoxy resins and more particularly concerns novel and useful compositions of matter which, when mixed with conventional epoxy resins and cured, impart to such resins a degree of flexibility not heretofore achieved without the usual expected decrease in the other desirable properties associated with such resins.

Heretofore it has been the practice in the field of epoxy resins, when flexibility is desired, to add to the polymerizable monmeric epoxy resin a monoglycidyl derivative of a long chain aliphatic compound, such as, monoglycidyl derivative of a polyamide, polysulfide, fatty diamine, or the like. These additives, while normally compatible with the conventional epoxy resins, impart problems in that many of the desired physical and chemical properties of the polymerizable mixture and the resulting cured resin are lost. The most common loss is in impact strength and heat stability.

It has now been found that the addition of a polyglycidyl ether of a poly(chloroalkylene) glycol to conventional epoxy resin systems prior to curing will produce upon curing a flexible epoxy resin which has, in many instances, improved impact strength. Further, the flexibilizers here taught do not materially affect the heat stability of the cured product. Thus, it has been found that the addition of a product having the following general formula can impart flexibility without loss of heat stability and with increased impact strength.

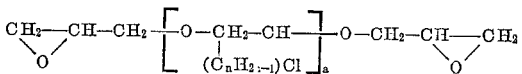

wherein n represents an integer from 1 to 2, a represents an integer from 2 to 30 or more. While it is considered to be an operable species of the present invention when a represents an integer less than 3 it is desirable in order to obtain a flexibility of commercial usefulness to use a polychlorohydrin of a weight average molecular weight above about 200, thus a as set forth above will generally have a value greater than 3.

In one manner of carrying out the present invention a chlorinated polyalkylene glycol (polyepichlorohydrin) is reacted with epichlorohydrin in at least stoichiometric quantities in the presence of a condensation catalyst and then dehydrohalogenated to form the diglycidyl ether. Alternatively, the condensation and dehydrohalogenation may be accomplished in a single step when using caustic as the catalyst and dehydrohalogenation reactant. The resulting polyglycidyl ether, preferably a diglycidyl ether, can be purified in conventional manner, such as distillation or the like. A further method is to treat a polyepichlorohydrin with caustic to dehydrohalogenate the terminal chlorohydrin units. The diglycidyl ethers of polyepichlorohydrin are viscous liquids.

The chlorinated dihydroxy compounds which can be employed in accordance with the teachings here set forth are the polyoxychlorinated glycols such as the polyhalohydrins having weight average molecular weights from 203 to 10,000 or more, such as polyepichlorohydrin, polyoxychlorobutylene glycol and the like.

The glycidyl-forming moiety hereinbefore set forth as epichlorohydrin can with equal success be epibromohydrin.

The flexibilizer, i.e., a diglycidyl ether of a poly(chloroalkylene glycol), is mixed with a conventional epoxy compound, such as for example, the diglycidyl ether of 4,4'-isopropylidene bis(phenol) sold commercially as DER 331 a diglycidyl ether of bisphenol A having an epoxy equivalent weight of 187–193; 332, a diglycidyl ether of bisphenol A having an epoxy equivalent weight of 179; Epon 828, a diglycidyl ether of bisphenol A having an epoxy equivalent weight of 200; Araldite 6010, a diglycidyl ether of bisphenol A having an epoxy equivalent weight of 185–196; Epi-Res 510, a diglycidyl ether of bisphenol A having an epoxy equivalent weight of 180–200, to mention only a few of the available commercial products; or the higher molecular weight polyglycidyl ethers such as DER 661, a diglycidyl ether of bisphenol A having an epoxy equivalent weight of 475–575; 664, a diglycidyl ether of bisphenol A having an epoxy equivalent weight of 875–975, and the like, and a conventional epoxy curing agent, as for example, the polyalkylene polyamines, the bis(cyanoalkyl)polyalkylene-polyamines, diethylenetriamine, bis(cyanoethyl) diethylenetriamines, dicarboxylic acids and anhydrides, Lewis Acids, or the like; potted, molded, cast or the like; and then cured with heat and/or aging as appropriate. The techniques of potting, molding, casting, and curing are well known and conventional in the art.

The following examples illustrate the present invention, but are not to be construed as limiting.

Example 1

The following data represent the results of physical tests run on cured epoxy resins obtained by curing a diglycidyl ether of Bisphenol-A (Epon 828, diglycidyl ether of bisphenol A having an epoxy equivalent weight of 200) and various weight percents of a flexibilizer as indicated (prepared as below) with a catalytic amount of diethylenetriamine as the curing agent at 100° C. for 4.5 hours. The viscosity shown is that of the uncured resin mixture.

Polyepichlorohydrin is epoxylated in the usual manner with at least two molecular equivalents of strong alkali.

TABLE I

| Flexibilizer | Parts by weight | Epoxy, parts by weight | Tensile (p.s.i.) | Impact, Izod, ft.-lbs./in.² at 24° C. | Viscosity (poises) 25° C. |
|---|---|---|---|---|---|
| Diglycidyl ether of polyepichlorohydrin, the polyepichlorohydrin having a weight average molecular weight of 450 | 30 | 70 | 5,400 | 1.8 | 16 |
| Do | 50 | 50 | 850 | 20.0 | 12 |
| Do | 70 | 30 | 372 | 4.0 | 8 |

*Example 2*

The following data represent the results of curing Epon 828 for 4.5 hours at 100° C. with a catalytic amount of bis(cyanoethyl)diethylenetriamine (Table II) or methylenedianiline (Table III) and Epon 828 and flexibilizer in accordance with the present invention.

TABLE II

| | Izod Impact Strength, ft.-lb./inch notch | Shore "A" Hardness |
|---|---|---|
| Epon 828 (Rigid) | 0.66 | |
| Epon 828+50 percent diglycidyl ether of polyepichlorohydrin weight average molecular weight 450 (Flexible) | 15.6 | 90 |

TABLE III

| | Viscosity poises at 25° C. | Heat Distortion Point, °F. | Flexural Strength, lb./in.² | Compression Yield Stress (p.s.i.) |
|---|---|---|---|---|
| Epon 828 | 129 | 310 | 16,000 | 17,000 |
| Epon 828+25 percent diglycidyl ether of polyepichlorohydrin weight average molecular weight 450 | 18 | 231 | 14,000 | 16,500 |

*Example 3*

In the manner of Example 2, using various percentages of Epon 828 and the diglycidyl ether of polyepichlorohydrin (weight average molecular weight of the polyepichlorohydrin 380 prepared in the manner of Example 1), the following physical properties of the cured resins were obtained.

TABLE IV

| Percent Flexibilizer by Weight in Resin Mixture | Shore "A" Hardness | Izod Impact |
|---|---|---|
| 0 | 99 | 0.4 |
| 5 | 99 | 0.4 |
| 10 | 99 | 0.4 |
| 15 | 99 | 0.5 |
| 20 | 99 | 0.6 |
| 25 | 98 | 1.0 |
| 50 | 90 | 15.7 |
| 67 | 63 | 4.8 |
| 75 | 53 | 2.4 |
| 80 | 47 | 1.6 |
| 83 | 41 | 1.1 |
| 100 | 37 | 0.6 |

TABLE V.—PROPERTIES OF FLEXIBLE RESINS IN 1:1 RATIO OF DER 332 TO FLEXIBILIZER
[Cure, 4 hrs. at 120° C., Curing agent, bis (cyanoethyl) deta]

| Flexibilizer | Dielectric Constant [1] | Power Factor [2] | Arc Resistance, sec.[3] | Izod Impact (ft.-lbs/in. of notch) [4] | | |
|---|---|---|---|---|---|---|
| | | | | After Curing | 64 hrs. at 80° C. | 4 hrs. at 145° C. |
| Diglycidyl either of polyepichlorohydrin (MW 1,000) [5] | 3.79 | 0.044 | 62 | 0.51 | 0.51 | 0.49 |
| | 4.09 | 0.071 | 9 | 19.3 | 9.0 | 1.1 |

[1] ASTM D150–54T.
[2] ASTM D150–54T.
[3] ASTM D495–48T.
[4] ASTM D256–54T, Method a.
[5] Prepared in the manner of Example 1 (MW=weight average molecular weight).

We claim:

1. An epoxy resin derived by curing with an epoxy curing agent selected from the group of polyalkylene polyamines, and p,p'-methylene dianiline, a mixture of a first diglycidyl ether of 4,4'-isopropylidene bis(phenol) and a second diglycidyl polyglycol ether having the formula

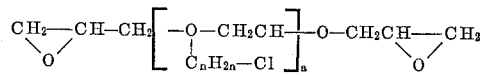

wherein $n$ represents an integer from 1 to 2; $a$ represents an integer from 2 to 30, the ratio by weight of the first to second ether being from 1 to 3 up to about 3 to 1.

2. The resin of claim 1 wherein said curing agent is p,p'-methylene dianiline.

3. The resin of claim 2 wherein said second ether is the diglycidyl ether of polyepichlorohydrin having an average weight molecular weight of about 450.

4. The resin of claim 3 wherein said first ether is a diglycidyl ether of 4,4'-isopropylidene bis(phenol) having an epoxy equivalent weight of about 200.

5. The resin of claim 1 wherein said curing agent is diethylene triamine.

6. The resin of claim 5 wherein said first ether is the diglycidyl ether of 4,4'-isopropylidene bis(phenol) having an epoxy equivalent weight of about 200.

7. The resin of claim 6 wherein said second resin is the diglycidyl ether of polyepichlorohydrin having an average weight molecular weight of 450.

8. The resin of claim 6 wherein said second resin is the diglycidyl ether of polyepichlorohydrin having an average weight molecular weight of 380.

9. The resin of claim 6 wherein said second resin is the diglycidyl ether of polyepichlorohydrin having an average weight molecular weight of 1000.

References Cited

UNITED STATES PATENTS 3,058,921   10/1962   Pannell _____ 260—830
3,281,491   10/1966   Smith _____ 260—830

GEORGE F. LESMES, *Primary Examiner.*

MURRAY TILLMAN, *Examiner.*

P. LIEBERMAN, *Assistant Examiner.*